United States Patent
Zhang et al.

(10) Patent No.: US 7,106,899 B2
(45) Date of Patent: *Sep. 12, 2006

(54) SYSTEM AND METHOD FOR PROGRESSIVE STEREO MATCHING OF DIGITAL IMAGES

(75) Inventors: Zhengyou Zhang, Redmond, WA (US); Ying Shan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 20 days.

This patent is subject to a terminal disclaimer.

(21) Appl. No.: 11/082,444

(22) Filed: Mar. 17, 2005

(65) Prior Publication Data

US 2005/0163366 A1    Jul. 28, 2005

Related U.S. Application Data

(60) Continuation of application No. 10/462,947, filed on Jun. 16, 2003, now Pat. No. 6,931,150, which is a division of application No. 09/564,839, filed on May 4, 2000, now Pat. No. 6,606,406.

(51) Int. Cl.
*G06K 9/00* (2006.01)
(52) U.S. Cl. ..................................... 382/154; 345/422
(58) Field of Classification Search ............... 382/154; 345/422; 348/47, 49, 50; 356/375, 376; 250/559.23, 559.31; 702/152, 172
See application file for complete search history.

(56) References Cited

U.S. PATENT DOCUMENTS 5,179,441 A * 1/1993 Anderson et al. ............. 348/43
5,719,954 A * 2/1998 Onda .......................... 382/154

(Continued)

OTHER PUBLICATIONS

Q. Chen et al., "A Volumetric Stereo Matching Method: Application to Image-Based Modeling", Proc. Conf. on Computer Vision and Pattern Recognition, vol. 1, pp. 29-34, Jun. 1999.*

(Continued)

*Primary Examiner*—Samir A. Ahmed
(74) *Attorney, Agent, or Firm*—Lyon & Harr, L.L.P.; Craig S. Fischer

(57) ABSTRACT

A method and a system for progressive stereo matching of digital images representing a scene. In general, the present invention uses a progressive iterative technique that includes a disparity gradient limit principle and a least commitment strategy. Generally unambiguous pixel matches are found by beginning with a few reliable pixel matches and finding progressively more unambiguous pixel matches. Unambiguous pixel matches are used to define the search ranges for each pixel to guide matching in the current iteration. Unambiguous pixel matches then are found using a novel correlation technique and based on a correlation score associated with a pixel match. The search range is capable of being rotated, and is part of a novel correlation technique that provides a more robust estimate of pixel match reliability. Potential pixel matches found in the search ranges are tested for ambiguity and unambiguous matches are selected and added to the reliable pixel matches.

20 Claims, 7 Drawing Sheets

(56) References Cited

U.S. PATENT DOCUMENTS 5,867,591 A * 2/1999 Onda ........................ 382/154
6,028,672 A * 2/2000 Geng ........................ 356/602
6,137,902 A * 10/2000 Kinoshita et al. ........... 382/154
6,519,358 B1 * 2/2003 Yokoyama et al. ......... 382/154
6,931,150 B1 * 8/2005 Zhang et al. ............... 382/154

OTHER PUBLICATIONS

S. B. Pollard et al., "A Stereo correspondence algorithm using a disparity limit", Perception, vol. 14, pp. 449-470, 1985.*
M Lhuillier and L, Quan, "Image interpolation by joint view triangulation", in Proc. Conf. on Computer Vision and Pattern Recognition, vol. 2, pp. 139-145, Colorado, Jun. 1999.*

* cited by examiner

SYSTEM AND METHOD FOR PROGRESSIVE STEREO MATCHING OF DIGITAL IMAGES

CROSS REFERENCE TO RELATED APPLICATIONS

This application is a continuation application of U.S. patent application Ser. No. 10/462,947, entitled "System and Method for Progressive Stereo Matching of Digital Images," filed Jun. 16, 2003, now U.S. Pat. No. 6,931,150 which is a divisional application of U.S. patent application Ser. No. 09/564,839, entitled "System and Method for Progressive Stereo Matching of Digital Images," filed May 4, 2000, now U.S. Pat. No. 6,606,406 and issued Aug. 12, 2003, the entire contents of which are hereby incorporated by reference.

BACKGROUND OF THE INVENTION

1. Field of the Invention

The present invention relates in general to computer vision and more particularly to a method and a system for progressive stereo matching of digital images that represent a scene.

2. Related Art

Stereo matching of digital images is widely used in many computer vision applications (such as, for example, fast object modeling and prototyping for computer-aided drafting (CAD), object segmentation and detection for human-computer interaction (HCI), video compression, and visual surveillance) to provide three-dimensional (3-D) depth information. Stereo matching obtains images of a scene from two or more cameras positioned at different locations and orientations in the scene. These digital images are obtained from each camera at approximately the same time and points in each of the image are matched corresponding to a 3-D point in space. In general, points from different images are matched by searching a portion of the images and using constraints (such as an epipolar constraint) to correlate a point in one image to a point in another image.

Several types of matching techniques exist and generally may be classified into two broad categories: feature matching and template matching. Feature matching extracts salient features from the images (such as corners and edge segments) and matches these features across two or more views. One disadvantage of feature matching, however, is that only a small subset of image pixels is used to match features. This means that if image pixels used in the matching process are unreliable then only a coarse and inaccurate 3-D representation of the actual scene is produced. Template matching uses an assumption that portions of images have some similarity and attempts to correlate these similarities across views. Although this assumption may be valid for relatively textured portions of an image and for image pairs having only small differences, the assumption may lead to unreliable matching at occlusion boundaries and within featureless regions of an image. In addition, template matching yields many false matches due in part to the unreliability of matched image pixels.

These and other existing stereo matching techniques have the disadvantage of having difficulty specifying an appropriate search range and being unable to adapt the search range depending on the observed scene structure. Existing dense matching techniques use the same search range (such as a small search window) for the entire image and thus may yield many false matches. In addition, some matching techniques consider only one match at a time and propagate the match in a small area, which also has the disadvantage of yield many false matches.

Accordingly, what is needed is a method and system for stereo matching that is capable of reducing false matches by adapting a search range depending on the scene structure. Further, this method and system would start with reliable pixel matches and progressively add reliable and unambiguous matches. What is also needed is a method and system for stereo matching that uses an adaptable search range that is dynamically determined by unambiguous pixel matches. Whatever the merits of the above-mentioned systems and methods, they do not achieve the benefits of the present invention.

SUMMARY OF THE INVENTION

To overcome the limitations in the prior art as described above and other limitations that will become apparent upon reading and understanding the present specification, the present invention includes a method and system for performing progressive stereo matching of digital images. In particular, the present invention uses a progressive iterative technique that uses a disparity gradient limit principle and a least commitment strategy to determine generally unambiguous pixel matches. The progressive iterative method of the present invention begins with a few reliable pixel matches and during successive iterations finds progressively more unambiguous pixel matches based on a novel correlation technique and a correlation score associated with a pixel match. Unambiguous pixel matches found in a previous iteration are used to define search ranges for subsequent pixels to reliably and efficiently determine matches in a current iteration. The present invention eliminates the problems of dense matching techniques whereby the same search range is used for the entire image. In the present invention, potentially false matches are reduced by dynamically changing the search range based on unambiguous matches found in previous iterations.

The present invention provides reliable and accurate pixel matching that begins with a reliable set of pixel matches and quickly adds a greater number of reliable pixel matches based on a pixel correlation. In addition, because at each step of the process the pixel matches are unambiguous, the present invention is highly efficient and fast because backtracking due to unreliable pixel matches is eliminated. Unlike many prior stereo matching techniques, the present invention works well with images containing featureless regions and is capable of changing an orientation of a search range based on the current set of reliable pixel matches.

In general, the method of the present invention includes determining a set of reliable (or unambiguous) pixel matches and progressively adding a greater number of unambiguous pixel matches to the set. The initial set of reliable pixel matches may be obtained either automatically (using a suitable matching technique that yields reliable pixel matches) or manually (such as through user input). Pixel matches are sought by defining a search range for each image and examining pixels within the search ranges for potential matches. The search range is capable of being rotated, and is part of a novel correlation technique of the present invention that provides a more robust estimate of pixel match reliability. After an iteration the set of reliable pixel matches acts as a constraint and helps define a new search range. This dynamic search range reduces potential matching ambiguities and increases the robustness of the process. Potential pixel matches found in the search ranges are tested for ambiguity and any unambiguous matches are selected and added to the set of reliable pixels matches. The ambiguity testing includes determining a correlation score for the pixel match and classifying the match based on the correlation score. The present invention also includes a system for progressive image matching that incorporates the method of the present invention.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Exemplary Operating Environment

Figure 1:
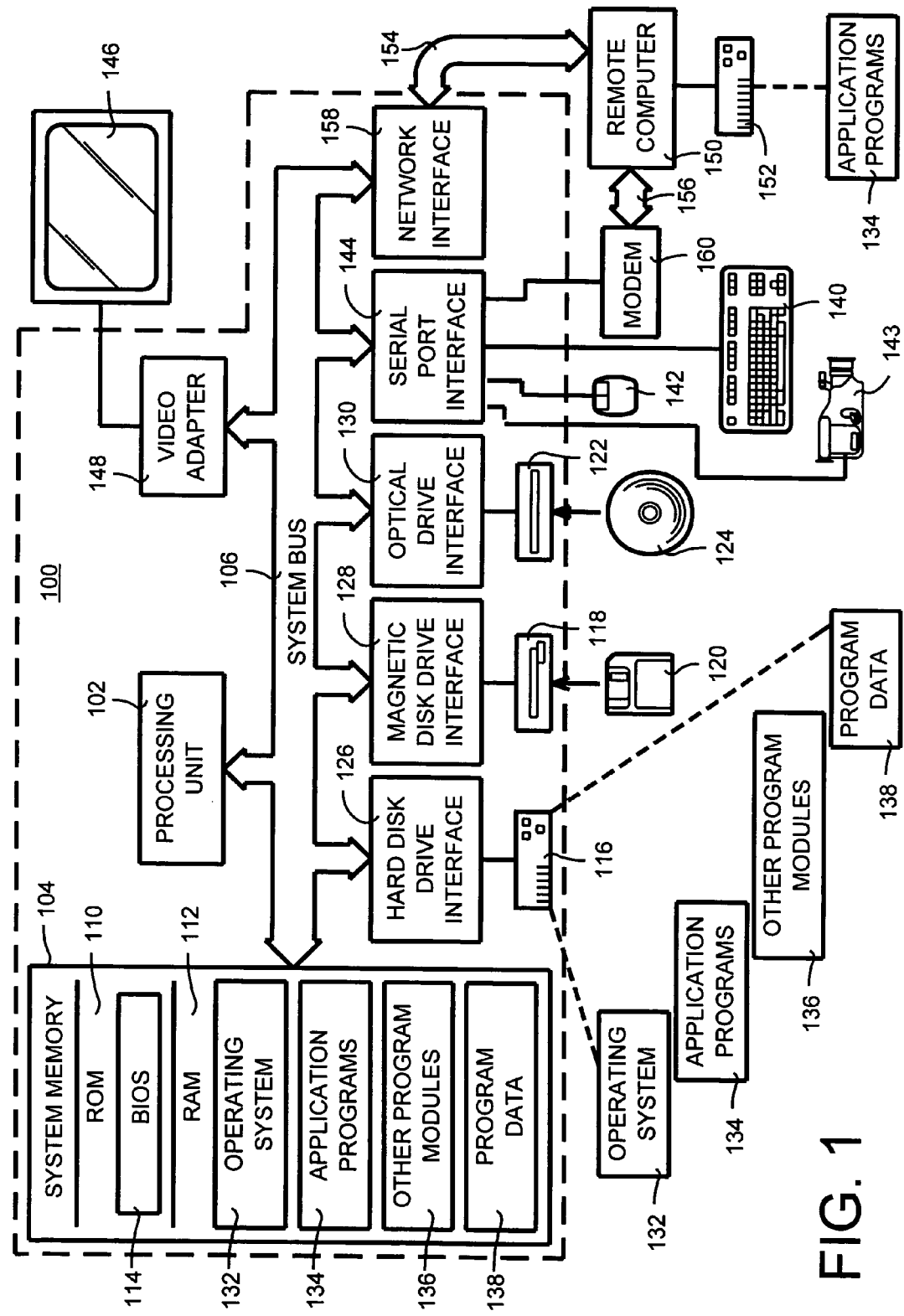
FIG. 1 is a block diagram illustrating an apparatus for carrying out the present invention.

FIG. 1 and the following discussion are intended to provide a brief, general description of a suitable computing environment in which the invention may be implemented. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 1, an exemplary system for implementing the invention includes a general-purpose computing device in the form of a conventional personal computer 100, including a processing unit 102, a system memory 104, and a system bus 106 that couples various system components including the system memory 104 to the processing unit 102. The system bus 106 may be any of several types of bus structures including a memory bus or memory controller, a peripheral bus, and a local bus using any of a variety of bus architectures. The system memory includes read only memory (ROM) 110 and random access memory (RAM) 112. A basic input/output system (BIOS) 114, containing the basic routines that help to transfer information between elements within the personal computer 100, such as during start-up, is stored in ROM 110. The personal computer 100 further includes a hard disk drive 116 for reading from and writing to a hard disk, not shown, a magnetic disk drive 118 for reading from or writing to a removable magnetic disk 120, and an optical disk drive 122 for reading from or writing to a removable optical disk 124 such as a CD-ROM or other optical media. The hard disk drive 116, magnetic disk drive 128 and optical disk drive 122 are connected to the system bus 106 by a hard disk drive interface 126, a magnetic disk drive interface 128 and an optical disk drive interface 130, respectively. The drives and their associated computer-readable media provide nonvolatile storage of computer readable instructions, data structures, program modules and other data for the personal computer 100.

Although the exemplary environment described herein employs a hard disk, a removable magnetic disk 120 and a removable optical disk 124, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 120, optical disk 124, ROM 110 or RAM 112, including an operating system 132, one or more application programs 134, other program modules 136 and program data 138. A user (not shown) may enter commands and information into the personal computer 100 through input devices such as a keyboard 140 and a pointing device 142. In addition, a camera 143 (or other types of imaging devices) may be connected to the personal computer 100 as well as other input devices (not shown) including, for example, a microphone, joystick, game pad, satellite dish, scanner, or the like. These other input devices are often connected to the processing unit 102 through a serial port interface 144 that is coupled to the system bus 106, but may be connected by other interfaces, such as a parallel port, a game port or a universal serial bus (USB). A monitor 146 or other type of display device is also connected to the system bus 106 via an interface, such as a video adapter 148. In addition to the monitor 146, personal computers typically include other peripheral output devices (not shown), such as speakers and printers.

The personal computer 100 may operate in a networked environment using logical connections to one or more remote computers, such as a remote computer 150. The remote computer 150 may be another personal computer, a server, a router, a network PC, a peer device or other common network node, and typically includes many or all of the elements described above relative to the personal computer 100, although only a memory storage device 152 has been illustrated in FIG. 1. The logical connections depicted in FIG. 1 include a local area network (LAN) 154 and a wide area network (WAN) 156. Such networking environments are commonplace in offices, enterprise-wide computer networks, intranets and the Internet.

When used in a LAN networking environment, the personal computer 100 is connected to the local network 154 through a network interface or adapter 158. When used in a WAN networking environment, the personal computer 100 typically includes a modem 160 or other means for establishing communications over the wide area network 156, such as the Internet. The modem 160, which may be internal or external, is connected to the system bus 106 via the serial port interface 144. In a networked environment, program modules depicted relative to the personal computer 100, or portions thereof, may be stored in the remote memory storage device 152. It will be appreciated that the network connections shown are exemplary and other means of establishing a communications link between the computers may be used.

II. Introduction

The method and system of the present invention includes a progressive matching technique that uses a disparity gradient limit principle and a least commitment strategy to provide reliable and efficient image matching. The disparity gradient limit principle states that a disparity should vary smoothly throughout an image, and that disparity gradient should not exceed a certain threshold. The least commitment strategy states that the most reliable pixel matches should be selected first and decisions about unreliable pixel matches should be deferred until the more confidence can be achieved that the pixel match is reliable. The two approaches, along with a correlation approach that, in a preferred embodiment, uses a Bayesian inference framework, are used to provide reliable, efficient and rapid matching of images.

In general, the present invention includes an iterative matching technique that may be embodied in a computer hardware or software system that progressively matches digital images representing a scene to obtain 3-D structure information about the scene. The iterative matching process begins with a few reliable pixel matches that have been obtained in a suitable manner (such as from user input). For each iteration additional reliable pixel matches are added to the initial set of pixel matches according to the least commitment strategy so that the number of unmatched pixel is rapidly reduced. The set of reliable pixel matches constrains a search range for neighboring pixels according to the disparity gradient limit principle, thereby reducing potential matching ambiguities of the neighbors. A novel correlation technique allows a correlation window representing the search range to be rotated to provide a more robust estimate of the reliability of a pixel match.

III. General Overview

Figure 2:
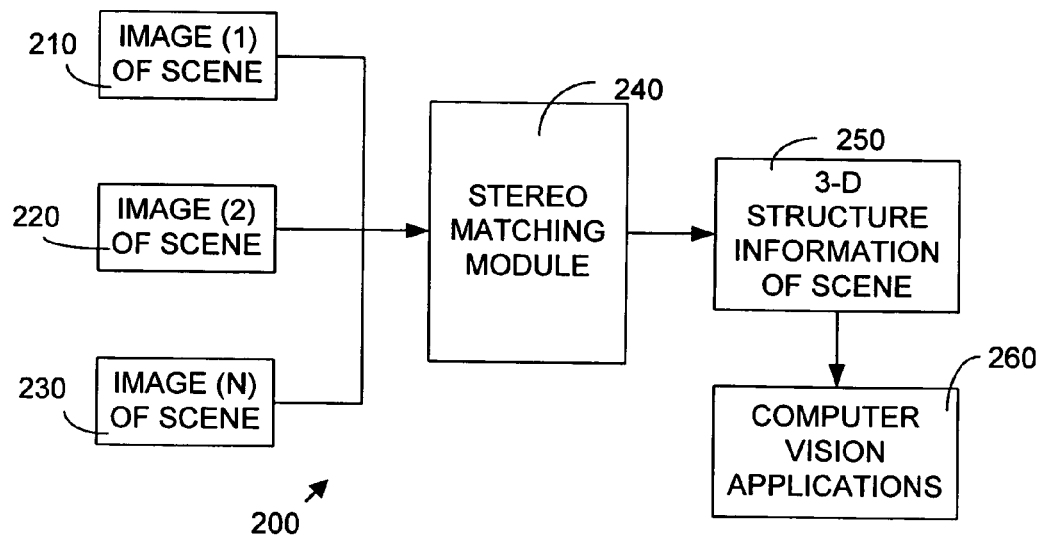
FIG. 2 is a general block diagram illustrating a system incorporating the stereo matching module of the present invention for computer vision applications.

As shown in FIGS. 2–10 for the purposes of illustration, the invention is embodied in a method and a system for progressive stereo matching of digital images that represent a scene. FIG. 2 is a general block diagram illustrating a system incorporating the stereo matching module of the present invention for computer vision applications. The system illustrated is only one example of several systems that could incorporate the progressive stereo matching method and system of the present invention. In general, the system 200 receives an input of digital images depicting a scene, shown in FIG. 2 as image (1) 210, image (2) 220 through image (N) 230. Each of the images 210, 220, 230 may be graphical images captured by a camera that contain two-dimensional (2-D) image data of the scene, in any suitable format, such as a bitmap or raster image data format.

The system 200 includes a stereo matching module 240 that receives the images 210, 220, 230 and correlates 2-D information within each of the images 210, 220, 230 to a three-dimensional point in space. The stereo matching module outputs information (such as depth information) about the 3-D structure of the scene (box 250). This 3-D structure information may be used by computer vision applications 260 in any suitable manner such as, for example, to digitally reconstruct the scene for stereo vision applications.

The present invention reliably and accurately determines a 3-D structure of a scene using at least two input images. The present invention solves the problems discussed above of prior matching techniques by starting with a few reliable initial point matches and progressively adding new pixel matches during an iterative matching process. At each iteration only reliable and unambiguous matches are selected and added to a set of reliable pixel matches. In addition, the robustness of the present invention is increased by using a correlation match measure that allows rotation of the match template used to search for pixel matches.

IV. Component Overview

Figure 3:
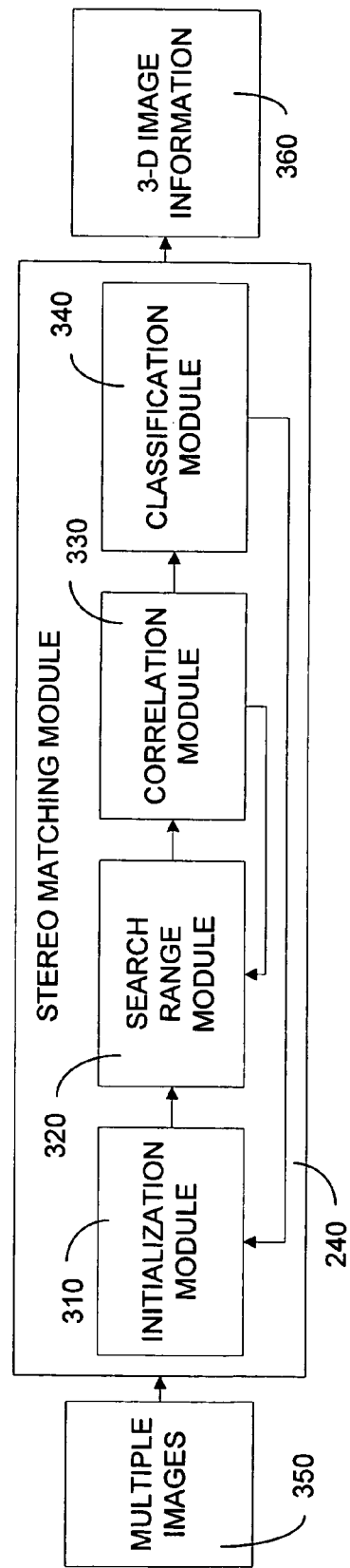
FIG. 3 is a general block diagram of the stereo matching module of the present invention shown in FIG. 2.

FIG. 3 is a general block diagram of the stereo matching module 240 of the present invention shown in FIG. 2. The stereo matching module 240 illustrates a single iteration of the module 240. In general, the stereo matching module 240 includes an initialization module 310, which obtains reliable initial pixel matches and a search range module 320, which determines a search range to look for candidate pixel matches. Moreover, the stereo matching module 240 includes a correlation module 330, for computing a correlation score between pixel matches and a classification module 340, for classifying a pixel match based on its correlation score.

The stereo matching module 240 receives as input multiple images (box 350) representing a scene. At least two images are needed as input, and the multiple images may be obtained in any suitable manner, such as from a camera. The initialization module 310 obtains a few reliable seed pixel matches. These initial matches may be obtained either automatically or through user input. The initial pixel matches are sent to the search range module 320 that defines a search range based on the pixel matches. Pixels from each image within the search range are correlated by the correlation module 330. Based on how well the pixels correlate, the classification module 340 assign a match label to the pixel match to indicate a pixel match, no pixel match or an unknown match at this time. Once enough pixel matches have been found (or a maximum number of iterations has occurred), the stereo matching module 240 outputs 3-D image information (box 360) regarding the 3-D structure of the scene.

V. Details of the Components and Operation

The present invention uses a progressive technique to match pixels from different images and makes use of a disparity gradient strategy and a least commitment strategy. Based on these two approaches, the present invention provides a iterative progressive technique that starts with a few reliable seed matches and then finds progressively more pixel matches based on these two approaches. The following discussion describes these two approaches.

1. Disparity Gradient Limit Principle

Disparity is a parameter that is directly related to depth. Accordingly, a change in disparity coincides with a change in depth. The disparity gradient limit principle states that the disparity should vary smoothly almost everywhere, and the disparity gradient should not exceed a certain value. Psychophysical studies have shown that in order for the human visual system to binocularly fuse two dots of a simple stereogram, a disparity gradient (the ratio of the disparity difference) between the dots to their cyclopean separation must not exceed a limit of 1. Objects in the real-world are usually bounded by continuous opaque surfaces, and the disparity gradient can be considered as a measure of continuity. The disparity gradient limit principle provides a constraint on scene jaggedness embracing simultaneously the ideas of opacity, scene continuity, and continuity between views. As explained further below, the disparity gradient limit principle is used in the present invention to estimate the uncertainty of a predicted disparity for a particular pixel. That uncertainty is then used to define search ranges for candidate pixel matches.

2. Least Commitment Strategy

A least commitment strategy states that only the most reliable decisions should be selected first and any unreliable decisions should be postponed until enough confidence in the decision is accumulated. Because no irreversible decision is made (in other words, only reliable decisions are made), this strategy offers significant flexibility in avoiding a locking search into a possibly incorrect step where an expensive refinement (such as backtracking) would have to be exploited.

The present invention uses the least commitment strategy in the following ways. First, the least commitment strategy is used by the present invention when defining a search range. If the match of a pixel has to be searched in a wide range, there is a high probability that the found match is not a correct one. It is preferable to defer matching of these pixels for as long as possible because the search range may be reduced later after more reliable matches are established.

Second, the least commitment strategy is used by the present invention when search for matching pixels. In particular, a pixel is more discriminating in a highly textured neighborhood and it is difficult to distinguish pixels in the same neighborhood having similar intensity. Thus, more reliable matches for pixels are found in areas with strong textures, and the present invention attempts to match pixels in these areas first.

Third, the present invention uses the least commitment strategy when determining whether a pixel has a match. Specifically, there may be several candidate matches for a pixel, and rather than using expensive techniques (such as dynamic programming) to resolve the ambiguity, the present invention defers any decision. Once more reliable matches are found in the future, the ambiguity will become lower because of a better disparity estimate having a smaller uncertainty.

Finally, the present invention uses the least commitment strategy to efficiently keep track of the status of pixel matches. If a pixel does not have any candidate match, there is a good possibility the pixel is occluded by other pixels or is not in the camera's field of view. In this case, there is no need to search for a match for the pixel in the future. Similarly, if a match has already been found for the pixel, further search is not necessary. Both types of pixels are kept tracked by the present invention to increase efficiency and speed.

3. General Operation

In general, the present invention uses a progressive iterative process to determine a set of previous unambiguous pixel matches, define a search range based on this set of previous unambiguous pixel matches, search for current unambiguous pixel matches within the search range and append current unambiguous pixel matches to the set of previous unambiguous pixel matches. This iterative process of increasing the set of previous unambiguous pixel matches by appending current unambiguous pixel matches and redefining the search range based on the set of previous unambiguous pixel matches continues until suitable matching has been achieved. The iterative process of the present invention progressively finds more and more unambiguous pixel matches and dynamically defines a search range based on these reliable pixel matches to reduce potential false matches and increase reliability and efficiency.

Figure 4:
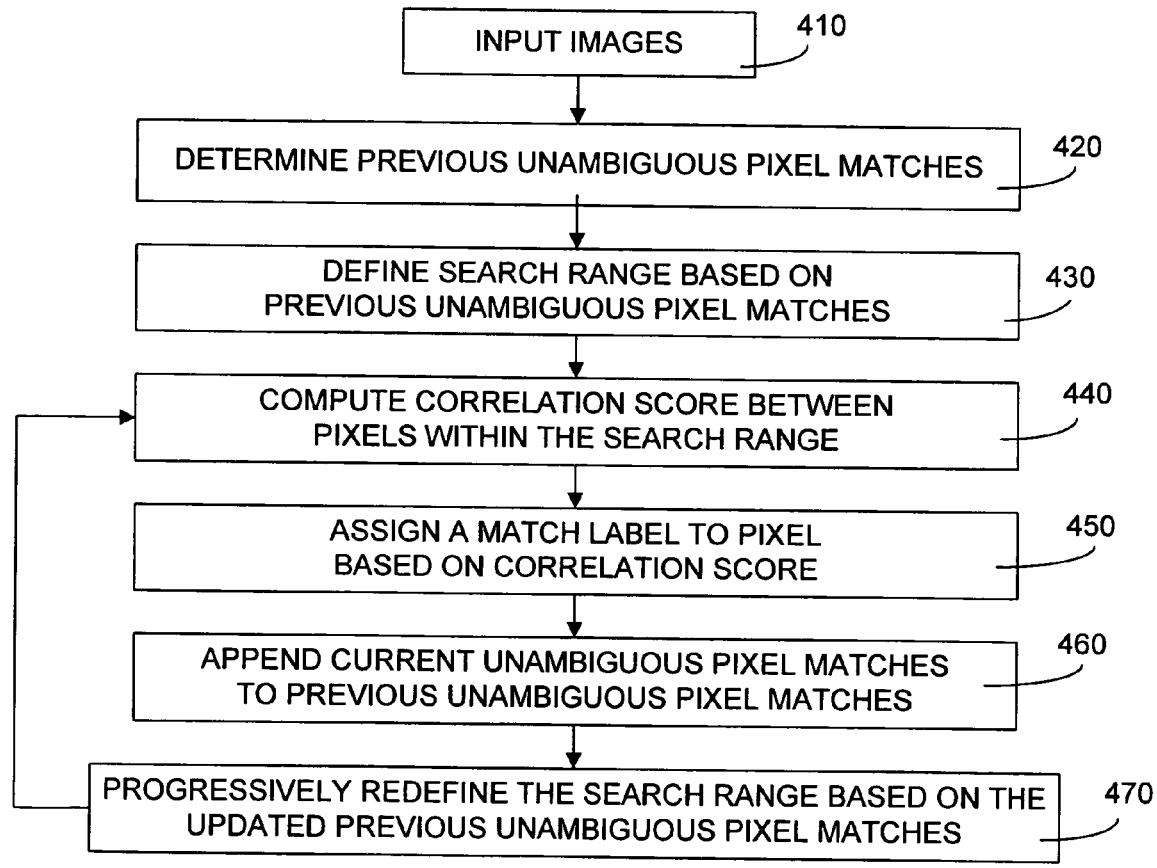
FIG. 4 is a general flow diagram of the operation of the present invention.

FIG. 4 is a general flow diagram of the operation of the present invention. Initially, at least two images are received as input (box 410). A set of previous unambiguous pixel matches then are determined (box 420). In general, if this is the first iteration the set of previous unambiguous pixel matches are obtained by finding a few reliable pixel matches in order to begin an iteration matching process. Otherwise, if this is a subsequent iteration, a set of previous unambiguous pixel matches obtained from previous iterations generally is used. The set of previous unambiguous pixel matches is used to define a search range (box 430). In particular, a size and an orientation of the search range is defined based on the set of previous unambiguous pixel matches and determines the location where the present invention will search for additional pixel matches within each of the images.

As discussed further below, the correlation technique of the present invention includes a search range that may be rotated in an image to permit a more reliable matching process. Pixels within the search range are obtained from each image and a correlation between the pixels is performed to compute a correlation score (box 440). Depending on the correlation score, a match label is assigned to the pixel (box 450). This match label specifies whether the pixel has been matched, not matched, or is still unknown. By way of example, one set of match labels (that are used in the example below) are MATCHED, NOMATCH and UNKNOWN.

When pixels within the search range are matched these current unambiguous pixel matches are appended to the set of previous unambiguous pixel matches (box 460). This updated set of previous unambiguous pixel matches is used in subsequent iterations to redefine the search range (box 470). The present invention continues this iterative process of progressively finding new unambiguous pixel matches, adding them to the set of previous unambiguous pixel matches and redefining the search range until the images have been suitably matched. Suitably matched generally means, for example, that a maximum number of iterations have occurred or that no further pixel matches can be found.

Figure 5:
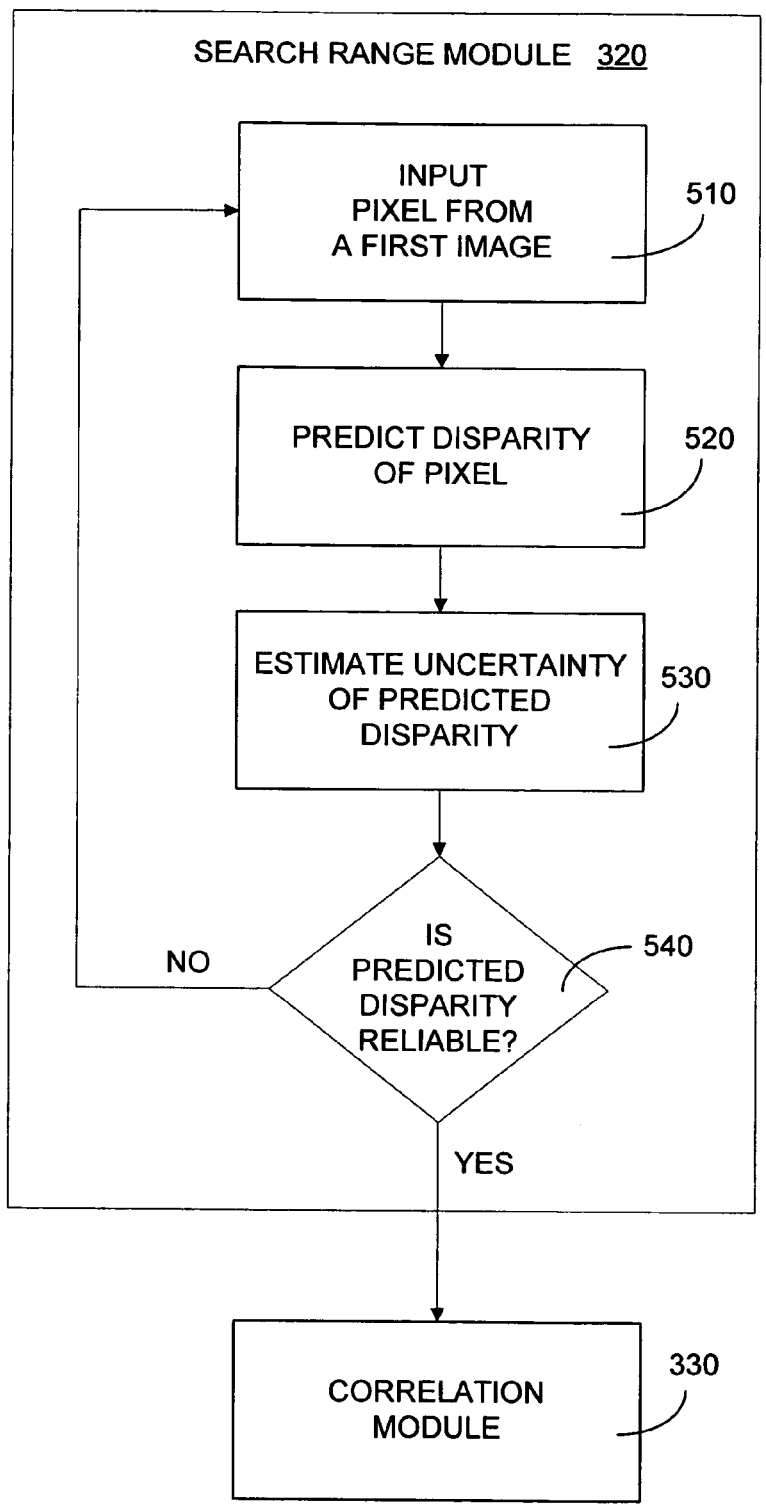
FIG. 5 is a general flow diagram of the operation of the search range module shown in FIG. 3.

FIG. 5 is a general flow diagram of the operation of the search range module shown in FIG. 3. In general, a pixel from a first image is an input (box 510) and the disparity of the pixel is predicted (box 520). Next, an estimate is made concerning the uncertainty of the predicted disparity (box 530). A determination is made as to whether the predicted disparity is reliable (box 540) and, if not, a decision is deferred, and another pixel is selected pixel and the matching iteration is performed again. If the predicted disparity is reliable, the pixel is sent to the correlation module 330 to determine how well the pixel in the first image and the pixel in the second image correlate.

4. Detailed Operation

Figure 6:
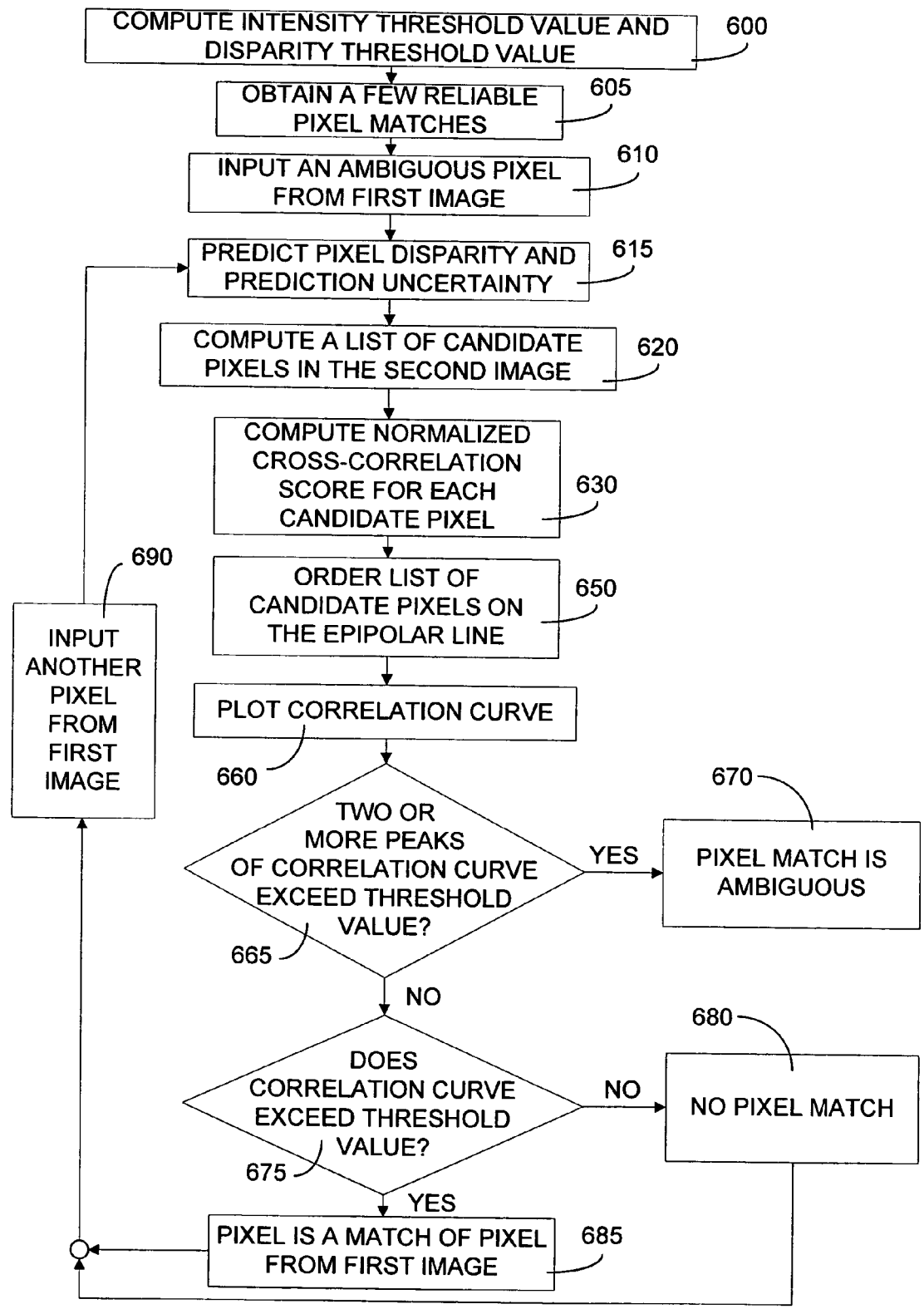
FIG. 6 is a detailed flow diagram illustrating a preferred embodiment of the present invention.

FIG. 6 is a detailed flow diagram illustrating a preferred embodiment of the present invention. It should be noted that the present invention may be implemented in a variety of ways and actual implementation may vary from the following description. In this preferred embodiment, pixels in highly textured areas are considered first. Textureness is measured as the sample deviation of the intensity within a correlation window. Moreover, in order for a pixel in the first image to be considered its sample deviation must be larger than an intensity threshold value, $T_{\sigma I}$ (called ThresholdSigmaIntensity). The ThresholdSigmaIntensity, $T_{\sigma I}$, evolves with each iteration and is given by a monotonic function that never increases with iteration. Similarly, if a given pixel in the first image has a large uncertainty of its disparity vector, then in a preferred embodiment the pixel should be considered as late as possible. For a pixel to be considered, the standard deviation of its predicted disparity vector must be smaller than a threshold $T_{\sigma D}$ (called ThresholdSigmaDisparity). The ThresholdSigmaDisparity, $T_{\sigma D}$, evolves with each iteration and is given by a monotonic function that never decreases with iteration. Thus, only pixels having a good prediction of the disparity vector are considered at the beginning of an iteration.

As shown in FIG. 6, the present invention computes an intensity threshold value and a disparity threshold value (box 600). These threshold values may be determined in a suitable manner such as, for example, by a user. In this preferred embodiment, the present invention gives a pixel in a first image one the following match labels: (a) MATCHED (indicating the pixel has been matched); (b) NOMATCH (indicating no pixel matches have been found); and (c) UNKNOWN (not yet decided). Initially, all pixels are given a match label of UNKNOWN, and a few reliable pixel matches are obtained (box 605) using a reliable technique. Once a few seed pixel matches have been obtained, the matching process iteration begins.

An ambiguous pixel from a first image is input (box 610), labeled as UNKNOWN and a pixel disparity of that pixel is predicted as well as the uncertainty of that disparity prediction (box 615). Next, a list of candidate pixels in the second image is computed (box 620) that satisfies the epipolar constraint and disparity gradient limit constraint. A normalized cross correlation, which is discussed in detail below, is used as a matching criterion. For a pair of pixels between two images, a normalized cross correlation score is computed (box 630) between two search ranges, one for each image. In a preferred embodiment, the search range uses two small windows (called correlation windows) centered at the pixel being examined. The correlation score ranges from −1, for two correlation windows that are not similar at all, to +1, for two correlation windows that are approximately identical.

A pair of pixels is considered as a potential match if their correlation score is larger than the intensity threshold value. The list of candidate pixels is ordered on the epipolar line (box 650) and the correlation scores are plotted to form a correlation curve (box 660). A determination is then made as to whether two or more peaks of the correlation curve exceed the intensity threshold value (box 665). If so, then the pixel match is ambiguous (box 670) and, in accordance with the least commitment strategy, the decision about the pixel match is deferred to a later time and the pixel remains labeled as UNKNOWN.

If not, then a determination is made as to whether the correlation curve exceeds the intensity threshold value (box 675). If there is no peak exceeding the intensity threshold value then there is no pixel match (box 680) and the pixel is label as NOMATCH. Alternatively, if there is one peak on the correlation curve exceeds the intensity threshold value then the pixel at the peak is considered as the match of the given pixel in the first image (box 685) and the given pixel is labeled as MATCHED. Another iteration is performed in accordance with the present invention and another pixel from the first image (labeled UNKNOWN) is selected for matching (box 690). The matching process of the present invention continues this progressive iterative process until no more matches can be found or the maximum number of iterations is attained.

The preferred embodiment of the present invention as shown in FIG. 6 has a number of important properties. For example, the present invention uses a progressive matching technique. Accordingly, the number of pixels examined in each iteration becomes progressively smaller. In addition, as discussed further below, a search range for a pixel is reduced when the disparity is updated with more matched pixels. The progressive property of the present invention guarantees that the iterative matching technique is actually making some progress and that the search space is being reduced.

The present invention also has the property of monotonicity. For example, in a preferred embodiment the present invention uses the monotonic functions ThresholdSigmaIntensity, $T_{\sigma I}$ and ThresholdSigmaDisparity, $T_{\sigma D}$. For each iteration, the ThresholdSigmaIntensity, $T_{\sigma I}$ is getting smaller and the ThresholdSigmaDisparity, $T_{\sigma D}$ is getting larger. This means that the probability that a pixel labeled as UNKNOWN is selected for a matching test becomes higher and eventually results in more pixels having MATCHED or NOMATCH labels. Together with the up-date of disparity vectors and their uncertainty, the property of monotonicity guarantees that the set of UNKNOWN pixels considered is truly different from that prior to refinement. In other words, the set of UNKNOWN pixels is different in the sense of the actual pixels considered and also of their candidate pixels to match in the other image.

The present invention also has the property of completeness, which means that adding more pixels labeled as MATCHED or NOMATCH will not lose any potential matches. This property is desirable because it eliminates the need to perform an expensive refinement procedure (such as backtracking). Completeness is achieved because of the least commitment strategy, provided that the disparity gradient limit constraint is satisfied over the entire observed scene.

5. Correlation Technique

The present invention uses a novel correlation technique (including a dynamic search range that permits rotation of a correlation window) to correlate pixels of one image to pixels of another image. In particular, a search range is determined that includes a correlation window capable of being rotated within an image. This rotation of the correlation window provides a more robust estimate of a correlation between pixels.

Figure 7:
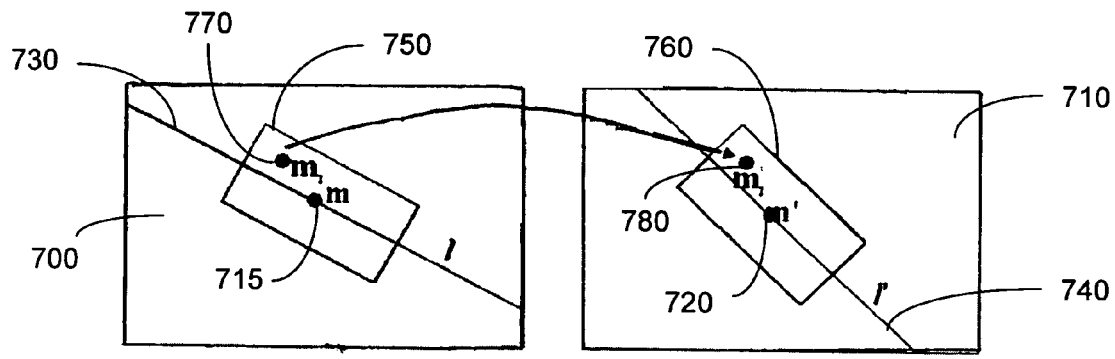
FIG. 7 illustrates the novel correlation technique between two images of the present invention

FIG. 7 illustrates the novel correlation technique between a first image 700 and a second image 710 of the present invention. In particular, consider a pair of points m 715 and m' 720 as shown in FIG. 7, where the corresponding epipolar lines l 730 and l' 740 are also drawn. A Euclidean transformation is computed where $R(\theta)$ is a 2D rotation matrix $$m'_i = R(\theta)(m_i - m) + m, \quad (10)$$

with a rotation angle equal to $\theta$, which is the angle between the two epipolar lines 730, 740. This sends m 715 to m' 720 and a point on l 730 to a point on l' 740.

A first correlation window 750 is chosen for the first image 700 that is centered at m 715 and having one side parallel to the epipolar line l 730. Similarly, a second correlation window 760 is chosen for the second image 710 that is centered at m' 720. In order to have one side of the second correlation window 760 parallel to the epipolar line l' 740 the correlation technique of the present invention allows rotation of the second correlation window 760. Although the shape of the first and second correlation windows 750, 760 are rectangular, it should be noted that a window of any geometry could have been chosen.

A point $m_i$ 770 within the first correlation window 750 corresponds to a point $m'_i$ 780 within the second correlation window 760 as given by equation (10). Point $m'_i$ 780 is generally not on the pixel grid, and its intensity is computed through bilinear interpolation from its four neighboring pixels. A correlation score is then computed between point $m_i$ 770 in the first correlation window 750 and point $m'_i$ 780 in the second correlation window 760 according to equation (10). A normalized cross correlation is used, which set the correlation score equal to 1 for two identical sets of pixels and equal to -1 for two completely different sets.

VI. Working Example and Exemplary Implementation

Figure 8:
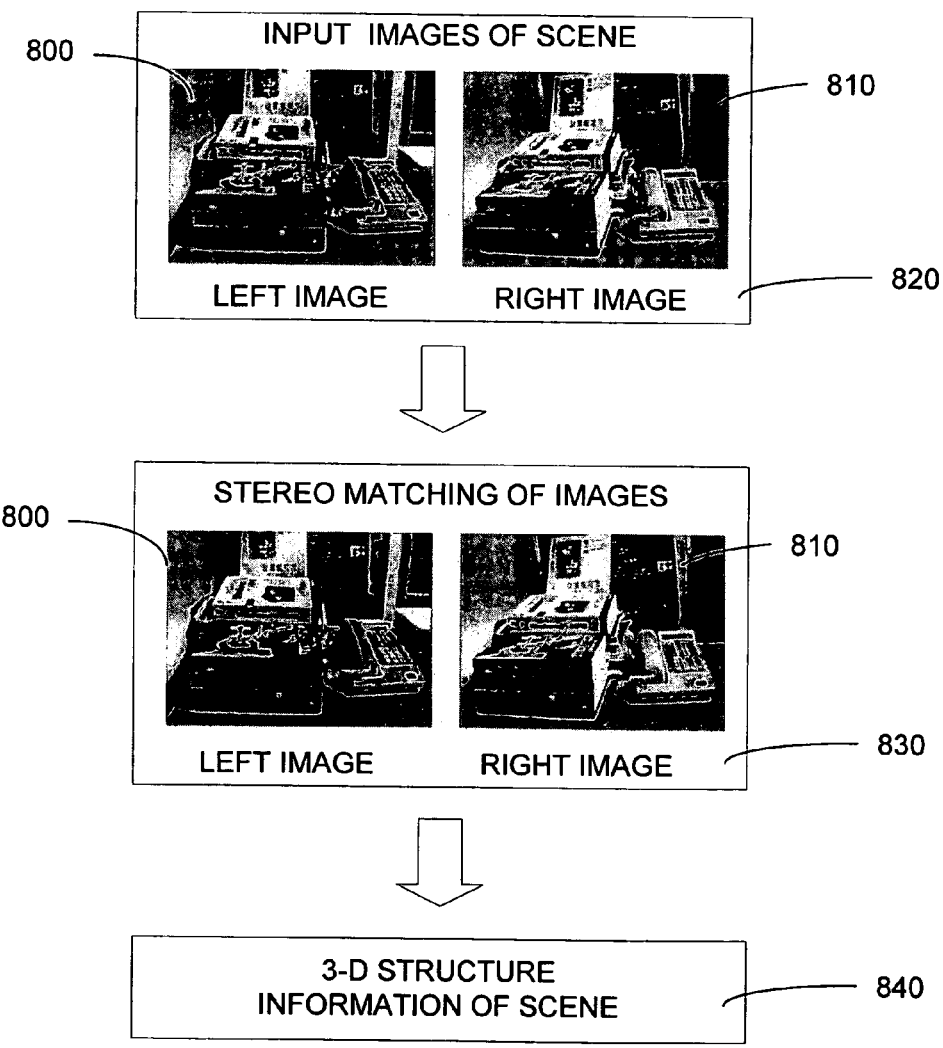
FIG. 8 is a working example of FIG. 4 whereby stereo matching of images representing a scene is performed in accordance with the present invention.

FIG. 8 is a working example of FIG. 4 whereby stereo matching of images representing a scene is performed in accordance with the present invention. In this working example, a left image 800 and a right image 810 of a scene are input images of the scene (box 820). Points within the left and right images 800, 810 are matched (box 830) using the stereo matching module 240 of FIG. 2. Matched points represent a 3-D point in space and are used to determine 3-D structure information of a scene (box 840), which, for example, may be used to perform a 3-D scene reconstruction.

An exemplary implementation of the working example of FIG. 8 will now be discussed. In this exemplary implementation, the present invention is formulated within a Bayesian inference framework. Bayesian inference, which is well-known to those skilled in the art, is discussed in detail by D. S. Sivia in "Data Analysis: a Bayesian tutorial" (Oxford University Press, 1996), the entire contents of which are hereby incorporated by reference. In this working example using a Bayesian inference framework, a first term, p(d|m, B), corresponds to a prior density distribution of the disparity, where d is a disparity of the given pixel m, and B denotes relevant background information (such as an epipolar geometry and a set of matched pixels). A second term corresponds to a sampling distribution p(I'|d, m, B), which includes the likelihood of observed data (within a second image I') when given d, m and B. Bayes rule is then used to combine the information in the data with the prior probability, which yields a posterior density distribution, $$p(d \mid I', m, B) = \frac{p(I' \mid d, m, B) p(d \mid m, B)}{p(I' \mid m, B)}, \quad (1)$$

where p(I'|m, B) does not depend on d and can be considered constant because the second image I' is fixed. Accordingly, the factor p(I'|m, B) can be omitted and an unnormalized posterior density distribution, p(I'|d, m, B) p (d|m, B), is considered (denoted by p(d|I', m, B)). Computations that summarize p(d|I',m, B) are performed and a pixel is considered to determine whether the pixel should be classified as MATCHED or NOMATCH, or classified as UNKNOWN for a future decision.

1. Prediction of Pixel Disparity and Uncertainty

As discussed above, the present invention uses a novel correlation technique (including a dynamic search range capable of rotation) to constrain a search for potential pixel matches based on a disparity gradient limit. The disparity gradient limit is exploited to estimate an uncertainty of a predicted disparity for a particular pixel, and this uncertainty is used to dynamically define a search range for candidate pixel matches. In this working example, the disparity gradient limit principle is used to predict pixel disparity and uncertainty as follows.

Disparity is well defined for parallel cameras where the two image planes are identical. In this case, without any loss of generality, an assumption may be made that the horizontal axis in both images is aligned. Given a first pixel of coordinates (u,v) in a first image and a corresponding second pixel of coordinates (u', v') in a second image, disparity is defined as the difference d=v'-v. Disparity is inversely proportional to the distance of the 3-D point to the cameras. Thus, a disparity of zero implies that the 3-D point is at infinity.

Consider two 3-D points whose projections are $m_1 = [u_1, v_1]^T$ and $m_2 = [u_2, v_2]^T$ in the first image, and $m'_1 = [u'_1, v'_1]^T$ and $m'_2 = [u'_2 v'_2]^T$ in the second image (where $u'_1 = u_1$ and $u'_2 = u_2$ when the two camera are parallel). The disparity gradient of these two points is defined to be the ratio of their difference in disparity to their distance in the cyclopean image. For example, for a pair of pixels in correspondence with coordinates (u, v) and (u', v') the cyclopean image point is at ((u+u')/2, (v+v')/2). In the first image, the disparity gradient is given by $$DG = \left| \frac{d_2 - d_1}{v_2 - v_1 + (d_2 - d_1)/2} \right|. \quad (2)$$

Experiments in psychophysics have shown that human perception imposes a constraint that the disparity gradient DG is upper-bounded by a limit K. In other words, if a point on an object is perceived, neighboring points having DG>K are not perceived correctly. For example, a theoretical limit for opaque surfaces is K=2 to ensure that the opaque surfaces are visible to both eyes. Although the range of allowable surfaces is large with K=2, disambiguating power is weak because false matches receive and exchange as much support as correct ones. In another example (and an extreme limit), K≈0, which allows only nearly front-parallel surfaces. In the PMF algorithm described by S. B. Pollard, J. E. W. Mayhew and J. P. Frisby entitled "PMF: a stereo correspondence algorithm using a disparity gradient constraint" in *Perception* (14:449–470, 1985), the entire contents of which are hereby incorporated by reference, the disparity gradient limit K is a free parameter, which can be varied over range from 0 to 2. An intermediate value (such as a value between 0.5 and 1) allows selection of a convenient tradeoff point between allowable scene surface jaggedness and disambiguating power because most false matches produce relatively high disparity gradients.

When the cameras are in "general position" (that is, image planes of the cameras do not lie on the same plane), it is not reasonable to define scalar disparity as a simple function of the image coordinates of two pixels in correspondence. In this working example, a disparity vector $d=[u'-u,v'-v]^T$ is used. In general terms, this disparity vector is the same as a flow vector used in optical flow computation. If a scalar value is necessary, we use $d=\|d\|$ and call the scalar value the disparity. If objects are observed that are smooth almost everywhere, both the disparity vector (d) and the disparity (d) should vary smoothly. Similar to equation (2), for two points $m_1$ and $m_2$ in the first image, we define the disparity gradient as, $$DG = \frac{\|d_2 - d_1\|}{\|m_2 - m_1 + (d_2 - d_1)/2\|}. \tag{3}$$

Imposing a gradient limit constraint that $DG \leq K$ yields, $$\|d_2 - d_1\| \leq K\|m_2 - m_1 + (d_2 - d_1)/2\|.$$

Using an inequality $\|v_1 + v_2\| \leq \|v_1\| + \|v_2\|$ for any vectors $v_1$ and $v_2$, gives, $$\|d_2 - d_1\| \leq K\|m_2 - m_1\| + K\|(d_2 - d_1)/2\|$$

which leads immediately, for K<2, to, $$\|d_2 - d_1\| \leq \frac{2K}{2-K} D, \tag{4}$$

where $D = \|m_2 - m_1\|$ is the distance between $m_1$ and $m_2$. This leads to the following result:

Lemma 1: Given a pair of matched points $(m_1, m'_1)$ and a point $m_2$ in the neighborhood of $m_1$, the corresponding point $m'_2$ that satisfies the disparity gradient constraint with limit K must be inside a disk centered at $m_2 + d_1$ with radius equal to $$\frac{2K}{2-K} D,$$

which is called the continuity disk.

In other words, in absence of other knowledge, the best prediction of the disparity of $m_2$ is equal to $d_1$ with the continuity disk defining the uncertainty of the disparity prediction.

In some cases it may be desirable to have the actual disparity at the central part of the continuity disk. Further, it may desirable to consider a small probability that the actual disparity is outside of the continuity disk (due to, for example, an occlusion or a surface discontinuity). Therefore, in this working example, the uncertainty is modeled as an isotropic Gaussian distribution with a standard deviation equal to half of the radius of the continuity disk. More precisely, given a pair of matched points $(m_i, m'_i)$, the disparity of a point m is modeled as $$d = d_i + D_i n_i, \tag{5}$$

where $d_i = m'_i - m_i$, $D_i = \|m - m_i\|$, and $n_i \sim N(0, \sigma_i^2 I)$ with $\sigma_i = K/(2-K)$. Note that disparity $d_i$ also has its own uncertainty due to limited image resolution. The density distribution of $d_i$ is also modeled in this working example as a Gaussian, namely, $p(d_i) = N(d_i | \bar{d}_i, \sigma_{d_i}^2 I)$. Thus, the density distribution of disparity d is given by $$p(d|(m_i, m'_i), m) = N(d|\bar{d}_i, (\sigma_{d_i}^2 + D_i^2 \sigma_i^2) I). \tag{6}$$

Given a set of point matches $\{(m_i, m'_i)|i=1, \ldots, n\}$, equation (6) then provides n independent predictions of disparity d. The prior density distribution of the disparity, $p(d|m, B)$, can be obtained by combining these predictions with a minimum variance estimator, $$p(d|m, B) = N(d|\bar{d}, \sigma^2 I), \tag{7}$$

where $$\bar{d} = \left(\sum_{i=1}^{n} \frac{1}{\sigma_{d_i}^2 + D_i^2 \sigma_i^2}\right)^{-1} \sum_{i=1}^{n} \frac{1}{\sigma_{d_i}^2 + D_i^2 \sigma_i^2} \bar{d}_i$$

$$\sigma^2 = \left(\sum_{i=1}^{n} \frac{1}{\sigma_{d_i}^2 + D_i^2 \sigma_i^2}\right)^{-1}.$$

Further, this may be made more robust by first identifying the Gaussian with smallest variance and then combining it with those Gaussians whose means fall within two or three standard deviations.

Next, $\sigma_i$ (which as mentioned above is related to the disparity gradient limit K) is chosen. Considering that the disparity gradient constraint is still a local one, it should become less restrictive when a point being considered is away from a matched point. Hence, a range $[\sigma_{min}, \sigma_{max}]$ is specified and $\sigma_i$ is given by $$\sigma_i = (\sigma_{max} - \sigma_{min})(1 - \exp(-D_i^2/\tau^2)) + \sigma_{min}. \tag{8}$$

When $D_i = 0, \sigma_i = \sigma_{min}$, and when $D_i = \chi, \sigma_i = \sigma_{max}$. The parameter $\tau$ in equation (8) controls how fast the transition from $\sigma_{min}$ to $\sigma_{max}$ is expected. In this working example, $\sigma_{min} = 0.3$ pixels, $\sigma_{max} = 1.0$ pixel, and $\sigma = 30$. This is equivalent to $K_{min} = 0.52$ and $K_{max} = 1.34$.

2. Computation of Pixel Disparity Likelihood

The sampling distribution, $p(I'|d, m, B)$, is computed next to obtain a likelihood that, given d, m and B, a pixel in the second image I' is a match for a first pixel. Because of the epipolar constraint, there is no need to compute the density for each pixel in I'. Further, there is also no need to compute the density for each pixel on the epipolar line of m because the prior density has been computed in equation (7). A list of pixels of interest (called candidate pixels and denoted by Q(m)) is an intersection of the epipolar line of m with a continuity disk as defined in Lemma 1.

Densities are related to correlation scores $C_j$ between m in the first image and each candidate pixel $m'_j \epsilon Q(m)$ in the second image. Using the correlation technique of the present invention as described above, a correlation score C that is approximately equal to −1 means that pixels are not similar at all while a correlation score C that is approximately equal to +1 means that pixels are generally identical. Correlation scores are mapped to densities by adding 1 followed by a normalization. More precisely, the correlation score $C_j$ of a pixel $m'_j$ is converted into a density as $$p(I'(m'_j) \mid d^{(j)}, m, B) = \frac{C_j + 1}{\sum_{k \in Q(m)} (C_j + 1)}, \quad (9)$$

where $d^{(j)} = m'_j - m$.

3. Match Label Inference

Using a posterior density distribution, an inference can be made as to the type of match between two pixels. In this working example, a match label is assigned to a pixel based on this inference. Namely, as discussed above, a pixel match may be assigned a label of MATCHED, NOMATCH or UNKNOWN. In this working example, the posterior density distribution p(d|I', m, B) is a multiplication of $p(I'(m'_j)|d^{(j)}, m, B)$ in equation (9) with $p(d^{(j)}|m, B)$ in equation (7) for each candidate pixel $m'_j$.

Based on the posterior density distribution, p(d|I', m, B), a number of inferences may be made. For example, if there is only one prominent peak (i.e., the peak is above a certain threshold value), the probability that this is a correct match is very high, and thus the pixel in the first image is given a match label of MATCHED. If there are two or more prominent peaks above the threshold, the matching ambiguity is high (in other words, the probability of making a wrong decision is high). Using the least commitment principle, this pixel is given a match label of UNKNOWN and is left to evolve. If there is no prominent peak at all above the threshold, the probability that the corresponding pixel in the second image is not visible is very high (meaning that the pixel may be either occluded by other pixels or out of the field of view). In this case, the pixel in the first image is given a match label of NOMATCH.

In order to facilitate the task of choosing an appropriate threshold on the posterior density distribution, and because the posterior density distribution otherwise unnormalized, the prior and likelihood functions are normalized differently. The prior function in equation (7) is multiplied by $\sigma\sqrt{2\pi}$ so that its maximum value is equal to one. The likelihood function in equation (9) is changed to $(C_j+1)/2$ so that it is equal to 1 for identical pixels and 0 for completely different pixels. Thus, in this working example, a peak in the posterior density distribution is considered a prominent peak (i.e., above a threshold value) if its value is greater than 0.3. For example, this corresponds to a situation where $C_j=0.866$ and the disparity is at $1.5\sigma$.

4. Results

In the working example of FIG. 8 (using the above exemplary implementation) a scene that included an office scene with books and a telephone on a desk was used. Although the images in the office scene were recorded in color, only black and white information was used. The image resolution for the office scene was 740×480 pixels.

In order to reduce computation cost, instead of using all previously found matches in predicting disparities and their uncertainties, only three neighboring points defined by a Delaunay triangulation were used. In particular, a dynamic Delaunay triangulation technique was used because of its efficiency in updating the triangulation when more point matches are available. This technique is discussed in detail by O. Devillers, S. Meiser and M. Teilluad in "Fully dynamic Delaunay triangulation in logarithmic expected time per operation" (*Comput. Geom. Theory Appl.*, 2(2): 55–80, 1992), the entire contents of which are hereby incorporated by reference. It is reasonable to use only three neighboring points because other points are usually much farther away, resulting in a larger uncertainty in its predicted disparity, hence contributing little to the combined prediction of the disparity given in equation (7).

Initial point matches (together with the fundamental matrix) were obtained automatically using a robust image matching technique. This matching technique is described by Z. Zhang, R. Deriche, O. Faugeras and Q. T. Luong in "A robust technique for matching two uncalibrated images through the recovery of the unknown epipolar geometry" (*Artificial Intelligence Journal*, 78:87–119, October 1995), the entire contents of which are hereby incorporated by reference. A search range of [−60,60] (pixels) for both horizontal and vertical directions was used for the scene.

Table 1 illustrates the number of pixel matches after each iteration. The number of matches for iteration 0 indicates the number of initial matches found by the robust matching algorithm. Note that instead of working on each pixel, only one every four pixels actually was considered because of the memory limitation in the Delaunay triangulation algorithm. Further, the values of the functions ThresholdSigmaIntensity, $T_{\sigma_I}$, and ThresholdSigmaDisparity, $T_{\sigma_D}$ with respect to the iteration number are given in the second and third rows of Table 1. For example, for iteration 4, $T_{\sigma_I}=4$ and $T_{\sigma_D}=18$.

TABLE 1

Number of matched pixels in each iteration

| | Iteration | | | | | | |
|---|---|---|---|---|---|---|---|
| | 0 | 1 | 2 | 3 | 4 | 5 | 6 |
| $T_{\sigma_I}$ | | 7 | 6 | 5 | 4 | 3 | 2 |
| $T_{\sigma_D}$ | | 12 | 14 | 16 | 18 | 20 | 20 |
| Number of Pixel Matches | 141 | 455 | 712 | 939 | 1239 | 1440 | 1500 |

After the initial set of point matches was obtained, the disparity and its uncertainty were predicted for each iteration after iteration 0. In particular, disparity vectors were displayed for every 10 pixels and their lengths were half of their actual magnitudes. In addition, the standard deviation of the predicted disparities was calculated. FIGS. 9A–9D illustrate the standard deviation of the predicted disparities of the working example for various iterations. Each figure is shown in gray levels after having been multiplied by 5 and truncated at 255. Thus, in FIGS. 9A–9D, a "black" pixel in a figure means that the predicted disparities were quite reliable, while a "white" pixel implies that the predicted disparities were very uncertain.

Figure 9A:
FIGS. 9A–9D illustrate the standard deviations of the predicted disparities for various iterations of the working example of FIG. 8.
Figure 9B:
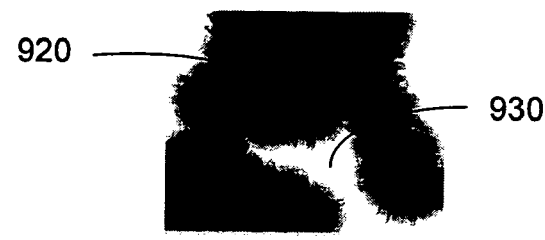
Figure 9C:
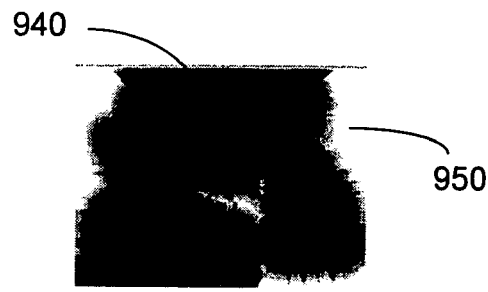
Figure 9D:
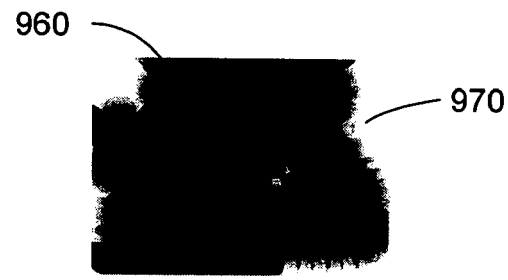

FIG. 9A illustrates the predicted disparity for the images shown in FIG. 8 after the initial point matches. A dark area 900 is the area where the predicted disparities were quite reliable and a light area 910 is the area where the predicted disparities were uncertain. It should be noted in FIG. 9A that the dark area 900 and the light area 910 are approximately equal in size. FIG. 9B illustrates the predicted disparity after the second iteration, where a dark area 920 has grown to be larger than a light area 930, meaning that there is a larger number of pixels having reliable predicted disparities. FIG. 9C, which illustrates the predicted disparity after the fourth iteration, shows dark area 940 much larger than a light area 950. Further, FIG. 9D illustrates the predicted disparity after the sixth iteration and shows a dark area 960 even larger still than a light area 970, with the dark area 960 nearly engulfing the entire image. Clearly, it can be seen how quickly reliable pixel matches evolve using the present invention. In particular, as shown in FIGS. 9A–9D, the uncertainty image becomes darker quickly, indicating that the predicted disparity of the pixel matches is becoming increasingly reliable after only a few iterations.

Figure 10:
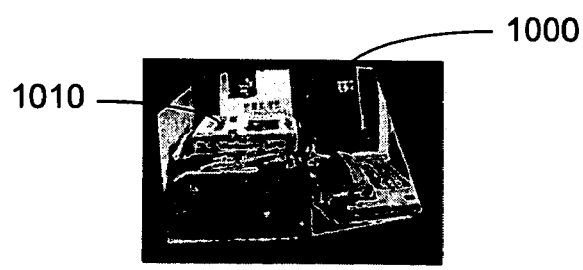
FIG. 10 illustrates a view of a 3-D Euclidean reconstruction of the scene of the working example of FIG. 8.

Once the stereo matching of the images in FIG. 8 was performed in accordance with the present invention, a 3-D Euclidean reconstruction was obtained. FIG. 10 illustrates a view of the 3-D Euclidean reconstruction 1000 using 3-D structure information obtained in accordance with the present invention. It should be noted that the office scene (especially the book structure 1010) has been precisely recovered.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A computer-readable medium having computer-executable instructions for stereo matching digital images representing a scene, comprising:
   determining possible pixel matches between a target pixel from a first digital image and pixels from a second digital image;
   evaluating a reliability of each of the possible pixel matches: and
   classifying a certain pixel match based on the reliability of the possible pixel matches;
   wherein classifying a certain pixel match further comprises:
   generating a list of candidate pixels from the pixels of the second image;
   ordering the list of candidate pixels on an epipolar line;
   determining a correlation score for each pixel on the list of candidate pixels;
   computing a correlation curve from the correlation scores;
   computing a threshold intensity; and
   determining a number of peaks on the correlation curve that approximately exceed the threshold intensity.

2. The computer-readable medium of claim 1, wherein a certain pixel match is classified as no match if the number equals zero.

3. The computer-readable medium of claim 1, wherein a certain pixel match is classified as ambiguous if the number is greater than one.

4. The computer-readable medium of claim 1, wherein a certain pixel match is classified as a match if the number is equal to one.

5. The computer-readable medium of claim 1, wherein the pixels from the second image satisfy an epipolar constraint.

6. The computer-readable medium of claim 5, wherein the pixels from the second image satisfy a disparity gradient limit constraint.

7. The computer-readable medium of claim 1, wherein the reliability is evaluated using the least commitment strategy.

8. The computer-readable medium of claim 1, wherein evaluating the reliability comprises:
   predicting a disparity between the target pixel and pixels from the second image; and
   estimating an uncertainty of the predicted pixel disparity.

9. A method for stereo matching digital images representing a scene, comprising:
   a determination step for determining possible pixel matches between a target pixel from a first digital image and pixels from a second digital image;
   an evaluation step for evaluating a reliability of each of the possible pixel matches; and
   a classification step for classifying a certain pixel match based on the reliability of the possible pixel matches;
   wherein the classification step for classifying a certain pixel match further comprises:
   a generation step for generating a list of candidate pixels from the pixels of the second image;
   an ordering step for ordering the list of candidate pixels on an epipolar line;
   a correlation step for determining a correlation score for each pixel on the list of candidate pixels;
   a computation step for computing a correlation curve from the correlation scores;
   a threshold step for computing a threshold intensity; and
   a comparison step for determining a number of peaks on the correlation curve that approximately exceed the threshold intensity.

10. The method of claim 9, wherein a certain pixel match is classified as no match if the number equals zero.

11. The method of claim 9, wherein a certain pixel match is classified as ambiguous if the number is greater than one.

12. The method of claim 9, wherein a certain pixel match is classified as a match if the number is equal to one.

13. The method of claim 9, wherein the pixels from the second image satisfy an epipolar constraint.

14. The method of claim 13, wherein the pixels from the second image satisfy a disparity gradient limit constraint.

15. The method of claim 9, wherein the reliability is evaluated using the least commitment strategy.

16. The method of claim 9, wherein the evaluation step further comprises:
   a prediction step for predicting a disparity between the target pixel and pixels from the second image; and
   an estimation step for estimating an uncertainty of the predicted pixel disparity.

17. A digital image stereo matching system for stereo matching of digital images representing a scene, comprising:
   an initialization module that determines possible pixel matches between a target pixel from a first digital image and pixels from a second digital image, evaluates a reliability of each of the possible pixel matches, and generates a list of candidate pixels from the pixels of the second image;

a correlation module that orders the list of candidate pixels on an epipolar line, determines a correlation score for each pixel on the list of candidate pixels, and computes a correlation curve from the correlation scores; and a classification module that classifies a certain pixel match based on the reliability of the possible pixel matches, computes a threshold intensity, and determines a number of peaks on the correlation curve that approximately exceed the threshold intensity.

18. The digital image stereo matching system of claim 17, wherein a certain pixel match is classified as no match by the classification module if the number equals zero.

19. The digital image stereo matching system of claim 17, wherein a certain pixel match is classified as ambiguous by the classification module if the number is greater than one.

20. The digital image stereo matching system of claim 17, wherein a certain pixel match is classified as a match by the classification module if the number is equal to one.

* * * * *